April 7, 1931.  A. J. NELSON  1,799,830

PNEUMATIC CONTROLLER RECORDER

Filed Aug. 2, 1928

Inventor
Abin John Nelson
By his Attorneys
Beeler & Schumacher

Patented Apr. 7, 1931

1,799,830

UNITED STATES PATENT OFFICE

ALBIN JOHN NELSON, OF BROOKLYN, NEW YORK

PNEUMATIC CONTROLLER RECORDER

Application filed August 2, 1928. Serial No. 296,959.

This invention relates to pneumatic temperature and pressure regulators and recorders associated therewith.

One object of the invention is to provide a device of the character described including a motor movable by pneumatic pressure and causing a member to move or deflect in accordance with the pressure and consequent movement of the motor, the said movement being independent of any resistance of the motor, and being opposed by the member so as to occur in constant ratio to the pressure over a considerable range, whereby an accurate temperature or pressure regulation is obtained.

Another object of this invention is to provide a device of the character described including a pneumatic system that is sensitive to temperature over a given range, and improved means co-operating therewith to control the flow of heat and regulate temperature uniformly throughout the said range.

Another object of this invention is the provision of an improved device of the nature set forth comprising a pneumatic temperature sensitive system that actuates a heat controlling motor, there being a resilient member coacting with the motor, so that the accuracy of temperature control throughout the range of the device is dependent solely upon the elasticity of the resilient member.

A further object of this invention is to construct a device of the type specified having improved means for setting the same to operate at a desired temperature.

A further object of the invention is to furnish a device of the species alluded to which comprises few and simple parts, that are easily adjusted, and which is comparatively inexpensive to manufacture, rugged and reliable in operation, and efficient in use to a high degree.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

Figure 1:
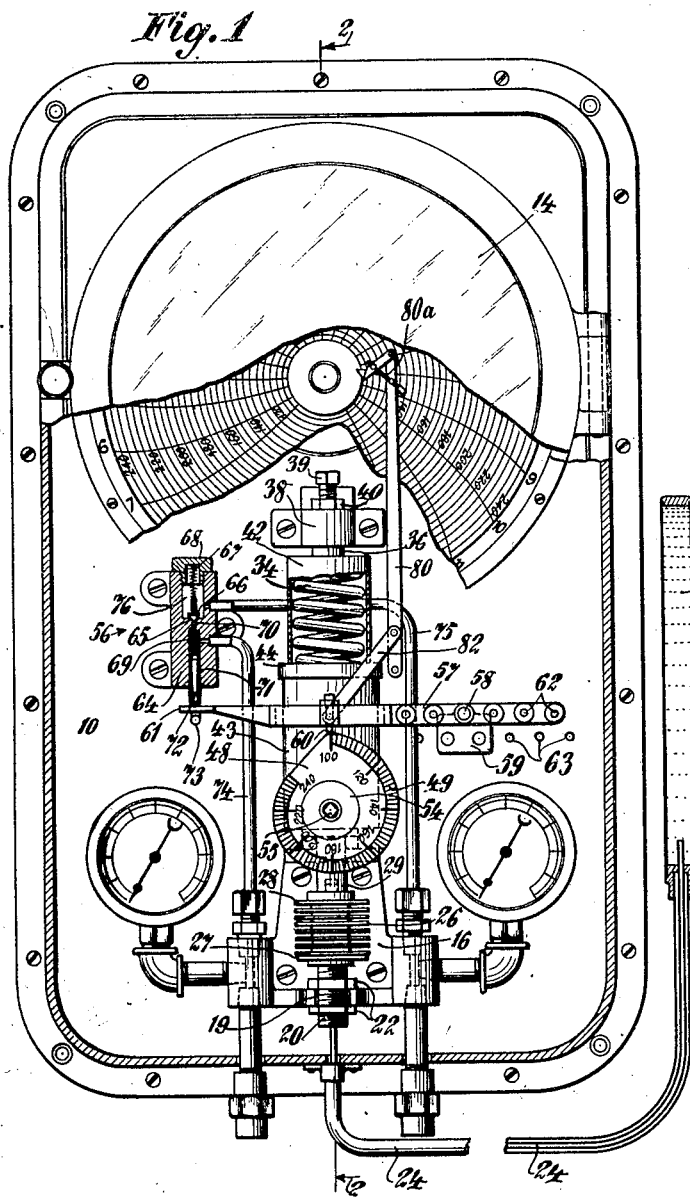
Figure 1 is a view in elevation of an embodiment of the invention, with parts removed to show interior construction.
Figure 2:
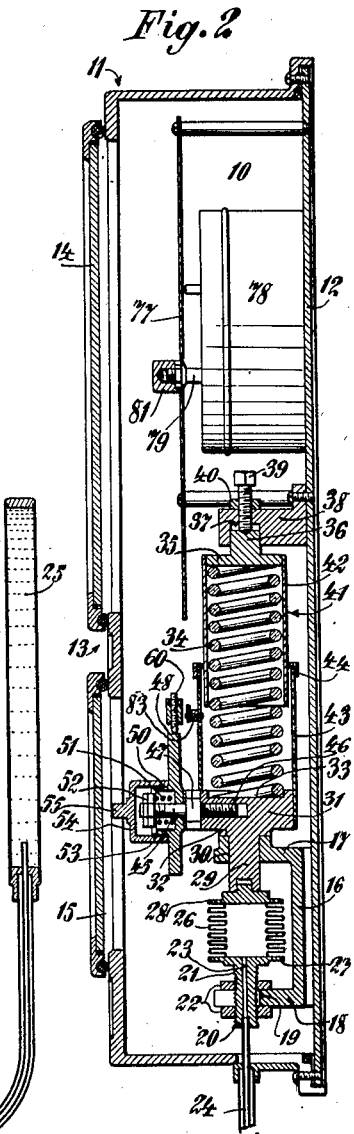
Fig. 2 is a vertical section of the same.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Generally described, the invention provides a pneumatic temperature or pressure regulator which functions with uniform accuracy throughout its range. The regulator includes a motor which is expanded by pressure from any suitable source, as, for example, a pneumatic system which is sensitive to temperature. The expansion of the motor is opposed by any suitable means, as, for instance, a resilient member, which can be set for any desired pressure in the motor and actuates a valve. In turn, a heat or pressure control means (not shown) is operated by another pressure controlled by the valve to maintain a uniform temperature or pressure in any type of container or receptacle. Since the curve of an elastic member is a straight line, the operation of this device is highly accurate. The motor itself is in the form of a bellows, so as to offer no appreciable resistance, nor is there any other extraneous factor such as the friction in a stuffing box, or the like, or back pressure to affect the characteristics of the curve. The heat control means is operated by an adjustable means that permits the device to be set for any temperature or pressure within its range, and which will also cause slow or rapid action of the heat control means. An automatic recorder may be used with the device if desired. It will be understood that, within the principle of the invention, the terms "temperature" or "pressure" may be considered synonymous.

Referring in detail to the drawing, 10 denotes a device embodying the invention. The same includes a suitable casing 11 having a rear wall 12 and a cover 13 engageable therewith. In the cover are the windows 14 and 15 through which the operation of the device may be observed.

Mounted on the rear wall 12 of the casing is a bracket 16 having a plurality of spaced horizontal arms 17 and 18. The latter arm is formed with an opening 19 to receive a tubular member 20 which is externally threaded at 21 to be secured to the arm 18 by locknuts 22. The member 20 is made with a capillary bore 23 which communicates at its lower end with a source of pressure, as, for example, a capillary tube 24 of the pneumatic system 25. The latter may be of any conventional type, and contains a volatile liquid which renders the system sensitive to the temperature of a heat receptacle, as, for instance, a steam container, or the like. At its upper end, the bore 23 communicates with a motor 26 which is movable or expansible under pressure. Preferably the motor is of the diaphragm or bellows type so as to afford no appreciable resistance and to expand readily under pressure. The wall of the motor is connected to a flange 27 integral with the tubular member 20, and the other end of the said wall is connected to a plate 28, which is engaged in any suitable manner, with a guide member 29 which is vertically slidable in an opening 30 of the upper arm 17. Accordingly, the motor is expansible vertically to move the member 29, and can be set at any desired elevation with respect to the bracket arm 17 by adjusting the locknuts 22.

The member 29 has a base portion 31 adapted to seat on the bracket arm 17 at the surface 32. The base 31 has a central seat 33 therein to receive a resilient member such as a coil spring 34. The upper end of the spring bears against a plate 35 having an extension 36 which has sliding engagement in a recess 37 of a bracket 38. The latter is stationary and is secured in any suitable manner to the rear wall 12 of the casing. A set screw 39 is threaded through the bracket 38 coaxially with said recess and is adapted to bear on the extension 36 to set the spring 34 at a proper tension. After this initial adjustment is made, the set screw is fixed by a locknut 40, and requires no further attention.

Enclosing the spring 34, is a telescopic casing 41, the same comprising the tubes 42 and 43 which are fixed to the members 31 and 35 respectively. A closure ring 44 acts between the tubes 42 and 43 to afford thorough protection to the spring, and may be positioned on the tube 43.

Extending laterally from the spring support 31, is a shaft 45 one end of which is threaded at 46 for engagement with said support, there being a head 47 at an end of the threaded portion abutting the said support. On the shaft 45 proper is mounted a rotatable cam 48 having indicia 49 formed thereon and calibrated to read in temperatures or pressures. The cam thus constitutes a dial that is visible through the window 15 of the casing. To retain the cam in any set position of adjustment, the same is provided with a friction clutch including a hollow hub 50, receiving a compression spring 51 that takes about the shaft 45, the said spring acting against nuts 52 threaded on to the adjacent end of the said shaft. Accordingly, the cam 48 is pressed into frictional engagement with the head 47 on the shaft.

The hub 50 is exteriorly threaded at 53 to engage a cover 54 that encloses the hub, said cover having a central key engaging projection 55, whereby the cam 48 can be conveniently rotated.

A heat or pressure control means 56, hereinafter more fully described, has coaction with the cam 48 to be operated on exceeding the condition for which the cam has been set. For this purpose a lever 57 may be pivotally mounted at 58 on a stationary bracket 59. The said lever is provided with an adjustable follower 60, in the nature of a set screw, and which has engagement with the cam. The end 61 of the lever is connected with the means 56 to operate the same when the lever is moved. To obtain a slow or rapid action of the device 10, the lever 57 is formed with a plurality of spaced pivot holes 62, and the rear wall 12 of the casing 11 is provided with a plurality of threaded holes 63, so that the bracket 59 may be moved for engagement at any of the holes 63, and the pivot 58 moved correspondingly to change the ratio of the arms of the said lever.

The heat control means 56 may be positioned wherever desired, as by being mounted on the rear wall 12 of the casing 11. Said means includes a valve body 64 having a valve seat 65 with which coacts the valve 66. The valve has an upward extending projection around which is wound one end of a compression spring 67, which is retained by a plug 68 screwed into the valve body. A guide rod 69 extends downward from the valve 66 through a bore 70, and thence into a larger bore 71. In the latter is a plunger 72 engaging at its upper end the guide rod 69 and at its lower end having abutting relation with the lever arm 61. A support 73 fixed to the valve body 64 underlies the arm 61, and limits the downward movement of the end of said arm.

The control 56 may operate a main valve (not shown) which governs the flow of the heat or pressure medium. The said main valve may be of the type that is provided with a diaphragm according to a well known construction. A tube 74 communicates with the diaphragm, and with the bore 71 in the valve body. A tube 75 communicates with the valve chamber 76 and with a source of pressure. When valve 66 is open, the pressure flows to the diaphragm to open the main valve, and when the valve 66 is closed, the pressure at the diaphragm is relieved, for example, by leakage at the bore 71 referred to.

A temperature or pressure recorder 77 includes a clock 78 on which is mounted a chart 79 and a coacting pen 80. The chart may be secured by a nut 81 to be rotated by the clock. A link 82 connects the pen with the sleeve 43 at 83 and permits a record to be made over the full range of operation of the device. An adjusting screw 80a co-operates with the pen. The chart may read in hours or minutes so that a complete history of the day's operation is available.

The operation of the invention will now be clearly apparent. The cam 48 is set to any desired temperature, and if 240 degrees is required, the cam is turned until this figure is in registry with the follower 60. The follower will then be spaced from the cam. As the temperature rises, vapor flows from the system 25 into the motor and expands the same. The motor in turn compresses the spring 34, causing an upward movement of the cam 48 and the sleeve 43, and a corresponding actuation of the pen 80. When the temperature exceeds 240 degrees, the cam will have been sufficiently elevated to strike the member 60 and cause the lever 57 to open the valve 66.

Due to the long travel of the spring 34, a lower ratio of the length the levers or links may be used for the pen, and consequently higher accuracy obtained. Furthermore, the valve 66 may have a greater travel, assuring better operation.

It will thus be seen that I have provided a device which fulfills the several objects of the invention and is well adapted to meet the conditions of practical use. The motor 26 can at all times be replaced without requiring any change in the setting of the spring 34 and without necessitating a recalibration thereof. This is due to the fact that the internal resistance of the said motor is inappreciable so that it will not in any way affect the operation of the spring, but can be directly incorporated into the device without necessitating a test of the latter.

I claim:

1. A device of the character described, including an operating diaphragm, a bulb sensitive to temperature and having a volatile liquid, said bulb communicating with said diaphragm, a rotatable cam having an axis fixed with respect to the diaphragm, a slide member movable and carried by the diaphragm in alinement therewith, said cam being axially mounted on the slide member, a lever movable by the cam, and a pressure control valve offset from the diaphragm and actuated by the lever, said lever being adjustable with respect to the axis of rotation of the cam.

2. A device of the character described, including an operating diaphragm, a bulb sensitive to temperature and having a volatile liquid, said bulb communicating with the diaphragm, a pressure control valve, means to adjustably cause the diaphragm to actuate said valve, said means including an adjusting member, a unitary means alined with the diaphragm and connected thereto, said adjusting member being mounted on said unitary means, and an element opposing the movement of the diaphragm, bearing on said unitary means, and a bracket of U form to one arm of which the diaphragm is anchored, the other arm being a guide for said unitary means, the diaphragm being positioned between said arms to protect the same.

3. A device of the character described, including an operating diaphragm, a bulb sensitive to temperature and having a volatile liquid, said bulb communicating with the diaphragm, a pressure control valve, means to adjustably cause the diaphragm to actuate said valve, a single supporting bracket for the diaphragm, said supporting bracket having integral side anchor portions between which the diaphragm is positioned, and inlet and outlet pressure connections for the valve, said connections being secured to the side portions of the supporting bracket.

In testimony whereof I affix my signature.

ALBIN JOHN NELSON.